(12) United States Patent
Lee et al.

(10) Patent No.: US 7,224,496 B2
(45) Date of Patent: May 29, 2007

(54) POSITIONING DEVICE FOR SCANNED OBJECT OF SCANNER

(76) Inventors: An-Lun Lee, 3F, No. 10, Ln. 70, Wu Yi St., Ling Ya District, KaoShiung (TW); Mei-Wen Huang, No. 9, Ln. 651, ChungShan Rd., MiaoLi (TW)

( * ) Notice: Subject to any disclaimer, the term of this patent is extended or adjusted under 35 U.S.C. 154(b) by 909 days.

(21) Appl. No.: 10/211,699

(22) Filed: Aug. 2, 2002

(65) Prior Publication Data

US 2004/0021915 A1 Feb. 5, 2004

(51) Int. Cl.
*H40N 1/04* (2006.01)
(52) U.S. Cl. ............ 358/474; 358/498; 358/505; 358/488; 355/113; 399/362; 399/377
(58) Field of Classification Search ........ 358/474, 358/298, 488, 497, 496, 498; 355/25, 113; 399/362, 377
See application file for complete search history.

(56) References Cited

U.S. PATENT DOCUMENTS

| | | | | |
|---|---|---|---|---|
| 4,980,720 | A | * | 12/1990 | Siegel ................... 399/52 |
| 5,012,275 | A | * | 4/1991 | Bock ..................... 355/25 |
| 5,475,505 | A | * | 12/1995 | Minasian et al. ........... 358/474 |
| 5,526,098 | A | * | 6/1996 | Peck et al. ................ 399/362 |
| 5,619,302 | A | * | 4/1997 | Wu ..................... 355/25 |
| 5,847,846 | A | * | 12/1998 | Wu et al. ................ 358/475 |
| 2002/0145098 | A1 | * | 10/2002 | Thompson ............... 248/460 |
| 2002/0191994 | A1 | * | 12/2002 | Lee ..................... 399/362 |

* cited by examiner

*Primary Examiner*—Douglas Q. Tran
*Assistant Examiner*—Negussie Worku
(74) *Attorney, Agent, or Firm*—Berkeley Law & Technology Group LLP

(57) ABSTRACT

The invention relative to a positioning device for the scanned object of a scanner may make a positioning function to a document or a book to be scanned. Through designing a positioning element on the shell body of a scanner, a book of many pages may be positioned or secured on the positioning element, which may be designed on the scanning window. According to the size, the form, or the thickness of the book, an appropriate positioning element may be used, and its number is selectively applied. The book is placed on the positioning element, wherein the middle recession part of the book is placed at the top end of the positioning element, by which a bulged-out part is formed and sandwiched into the middle recession part of the book to thereby secure the book in the positioning element.

37 Claims, 10 Drawing Sheets

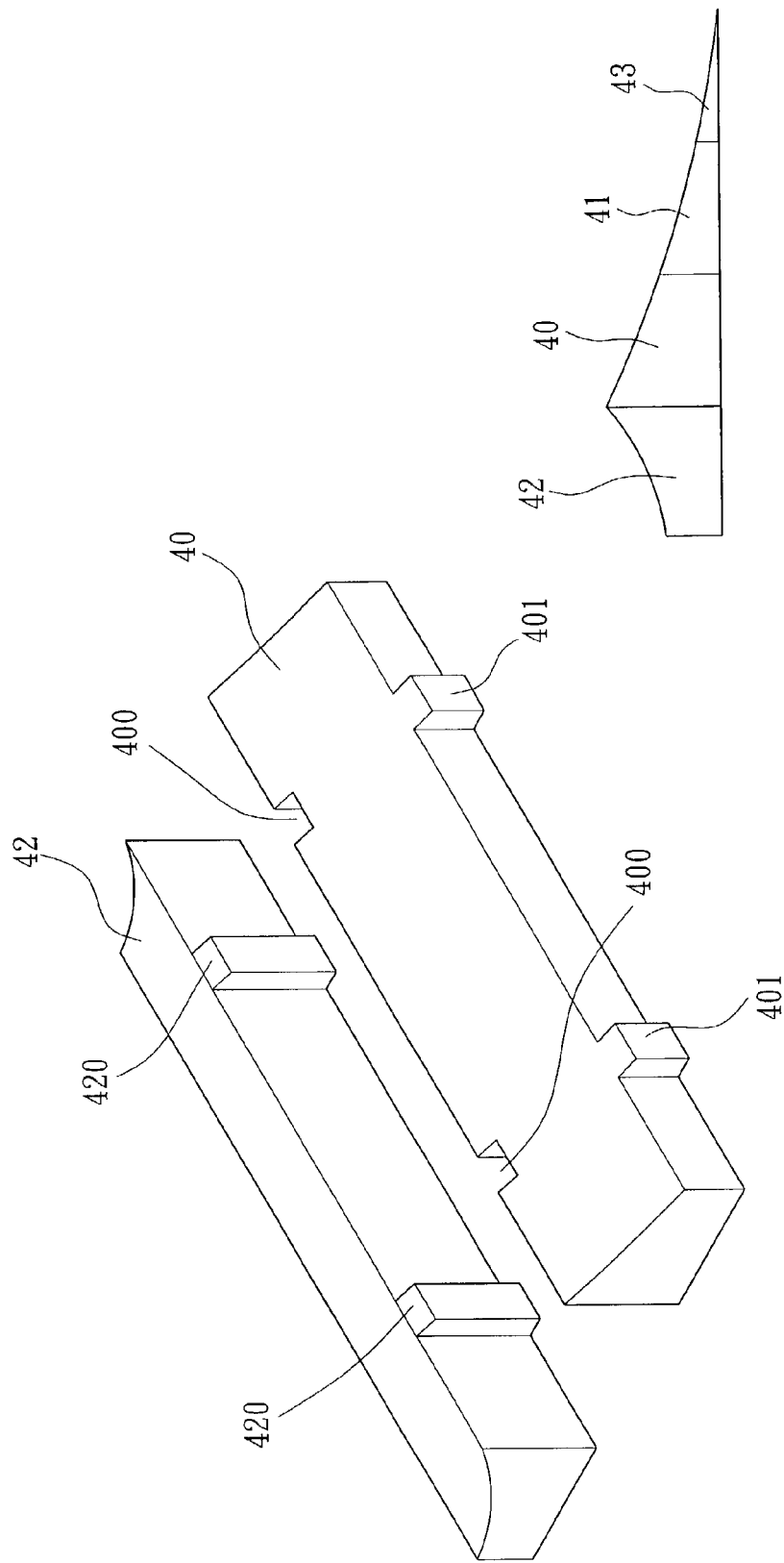

POSITIONING DEVICE FOR SCANNED OBJECT OF SCANNER

FIELD OF THE INVENTION

The invention that relates to a positioning device for the scanned object of a scanner may make a positioning function to a document or a book to be scanned, and the invention is particularly a design in a scanner to position the object to be scanned.

BACKGROUND OF THE INVENTION

Accordingly, computer has already penetrated into each family and enterprise to become an indispensable electronic product in our modern lives. Following the prevalence of computer multi-media, more accessory products are needed as the input and output devices, wherein the scanner further becomes one important input device for computer and is also an indispensable accessory device for computer in the application fields of image procession and word data input, such that the scanner is applied in various fields extremely extensively.

Currently, when an optical scanner used for ordinary document is scanning a book of plural pages, the user, in order to consider the fastness and convenience, mostly puts the book pages on the scanning window glass to proceed the scanning job. Usually, the user roughly aligns the book to the surface of the supporting glass by hand together with eye-viewing manner, then starts the scanner to scan so, although it is faster, the page to be scanned will not exactly be within the scanning zone on the supporting glass. Not only so, most pages of the book usually have certain degree of inclination or distortion, such that there are always some errors happened between the original manuscript and the image data after being scanned and, sometimes, a repeated scan has to be proceeded for obtaining a more accurate image effectiveness and, not only is the time wasted, but also is the scanning result poor.

Please refer to FIG. 1, which is an illustration for scanning a book of plural pages by an optical scanner according to the prior arts. As shown in FIG. 1, the scanner 1 includes: shell body 10, upper lid 11, and transparent supporting glass 12, etc. When the user is going to scan a book 13 of plural pages, the book 13 may be roughly put on the supporting glass 12 by manual manner, then the scanner is started to scan but, since the user only puts the book 13 roughly on the surface of the supporting glass 12, so there are often errors happened from this kind of human manner operated by hand and, for most of the time, the pages of the book won't be aimed within the scanning range of the supporting glasses and, sometimes, there is some degree of inclination or distortion, such that various shortcomings are caused as described thereinbefore. Therefore, if a device is designed at the scanner for securing and positioning the book, then above various shortcomings may be avoided, even though it is still operated manually.

SUMMARY OF THE INVENTION

In order to improve above technical shortcomings, the main objective of the invention is to provide a positioning function to the manuscript or the book to be scanned. Through designing a positioning element at the scanner, the book may be positioned or secured on the positioning element, which may be particularly designed on the scanning window or at its side.

Another objective of the invention is to provide a positioning base through the implementation of the invention such that, when the user is scanning a book of plural pages, it is convenient and fast to proceed the scanning action, so there won't be any book inclination or poor position happened to influence the scanning quality any more.

A further objective of the invention is that an appropriate positioning element may be chosen according to the size, the form, or the thickness of the books to be scanned, and the number of the positioning element is not limited to only one.

The invention includes shell body and positioning element, which may be fixed on the surface of the shell body for providing the position or the fixation to the book to be scanned. Through insetting the sandwiching tennon of the positioning element into the sandwiching groove on the shell body, the positioning element particularly assembled and secured with the scanner is located on the scanning window on the scanner, or the positioning element 21 covers one part of the scanning window, or the positioning element is located at the side of the scanning window without covering the scanning window.

Furthermore, the book is placed on the positioning element, and a middle recession part of the book is placed at the top end of the positioning element, by which a bulged-out part is formed to be sandwiched into the middle recession part of the book, such that the book is secured surely at the positioning element.

Again, the implementation of the positioning element is versatile to be able to include a curved surface, two curved surfaces, an inclining surface, two inclining surfaces, a form of triangular pillar, circular pillar, or semicircular pillar, etc.

Further, the positioning element may be matched with a blocking block for generating a positioning function to the book.

For your esteemed members of reviewing committee to further understand the functions and the characteristics of the invention, a detailed description together with corresponding drawings are presented as the following.

BRIEF DESCRIPTION OF THE DRAWINGS

FIG. 5A through FIG. 5D are preferable embodiments for illustrating the assembly of the positioning elements according to the invention.

DETAILED DESCRIPTION OF THE INVENTION

The invention, a positioning device for the scanned object of a scanner, may be arranged in a flat-typed optical scanner for positioning a manuscript or book to be scanned. Since a document to be scanned often has different types and characteristics and, particularly, some document to be scanned has certain thickness (e.g., book of plural pages) and there is large amount of page surface to be scanned, so the implementation of the present invention is to position or secure the book of plural pages and provide an additional positioning base to make the user during scanning the book of plural pages be able to proceed the scanning action in a more convenient and faster way without any situation of book inclination or poor position to influence the scanning quality, so it may effectively enhance the distinguishing ability of the software to clearly distinguish the data to be scanned, such that the shortcomings of the prior arts may be avoided completely, and a preferable scanning quality may further be obtained.

For facilitating your esteemed member of reviewing committee in understanding the invention, several drawings describing the detailed structure and its connection relationship are presented as the following.

Figure 1:
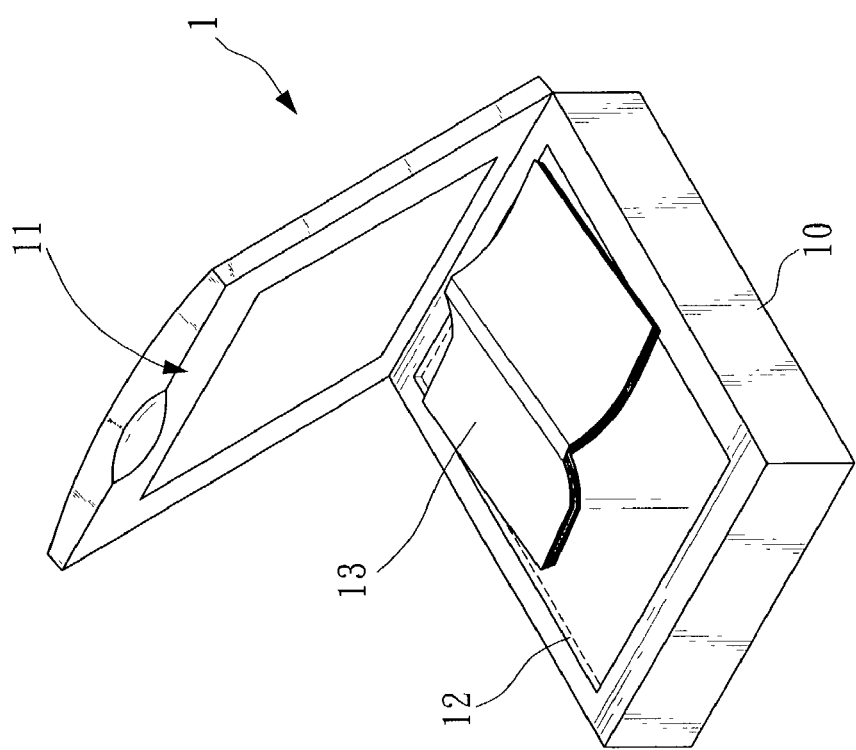
FIG. 1 is an illustration for scanning a book by an optical scanner according to the prior arts.
Figure 2A:
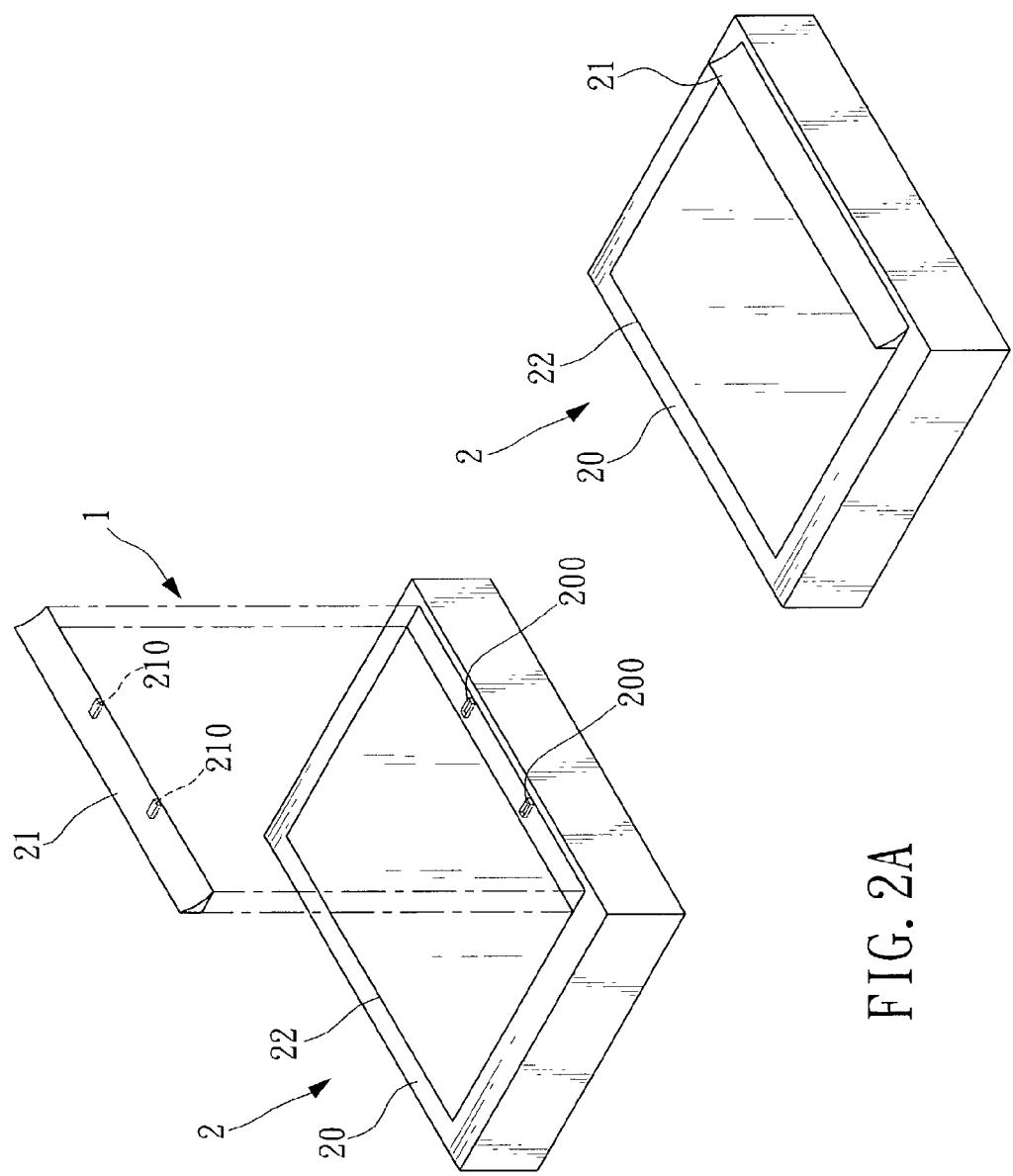
FIG. 2A and FIG. 2B are preferable embodiments for illustrating the assembly between a positioning element and a scanner according to the invention.

Please refer to FIG. 2A, which is a preferable embodiment for illustrating the assembly between the positioning element and the scanner according to the invention. The positioning device, for the scanned object of a scanner, provided by the invention and implemented in a scanner 2 (the upper lid of the scanner 2 is skipped without further description in following preferable embodiments), is comprised of a shell body 20 and a positioning element 21. The scanner 2 may make a scan on the object to be scanned. The positioning element 21 may be secured on the surface of the shell body 20 of the scanner for providing a position or a fixation to the object to be scanned. Through insetting the sandwiching tennon 210 at the lower side of the positioning element 21 into the sandwiching groove 200 on the shell body 20, the positioning element 21 is secured on the surface of the shell body 20. Particularly, after being assembled and secured with the scanner 2, the positioning element 21 is located on the scanning window 22 of the scanner 2, wherein the scanning window 22 is exactly the transparent supporting window, or the positioning element just covers one part of the scanning window, or the positioning element 21 is located at the side of the scanning window 22 without covering any part of the scanning window. In sum, the positioning element 21 is just placed on the surface of the shell body 20 as long as the positioning element 21 and the scanning window 22 particularly have a corresponding relationship with each other.

Figure 2B:
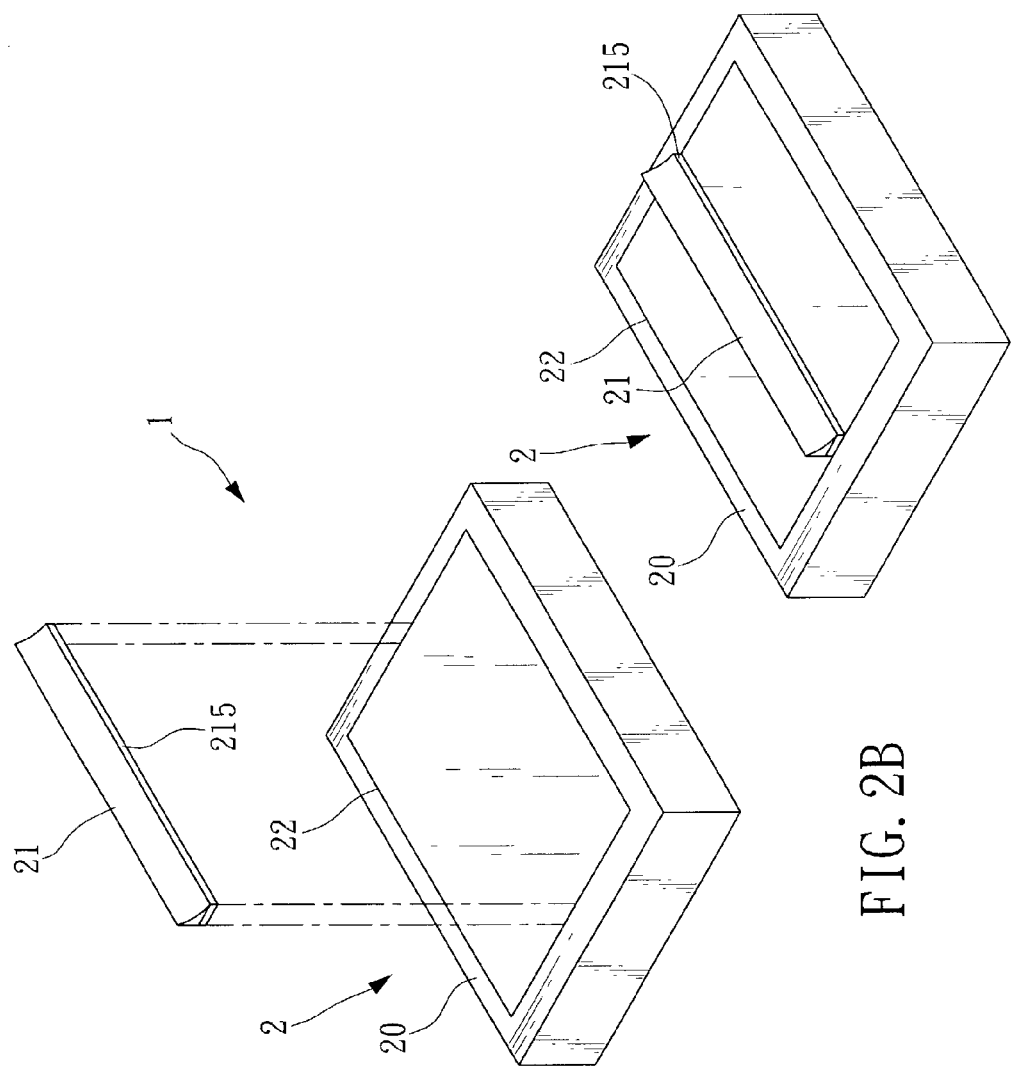

Please refer to FIG. 2B, which is another preferable embodiment for illustrating the assembly between the positioning element of the invention and the scanner. As shown in FIG. 2A, the positioning element 21 may be secured to the scanner for providing the scanned object to be positioned or secured. However, a medium or substance 215 with high friction coefficient is arranged at the lower side of the positioning element 21, such that a securing function is generated by placing the positioning element 21 on the scanning window 22, and the position of the book to be placed on the scanning window 22 may be changed according to the size and the dimension of the book. Of course, the positioning element 21 itself is comprised of a material of high friction coefficient as well, so there is unnecessary to design another material 215 having high friction coefficient in addition to the positioning element 21.

Figure 3:
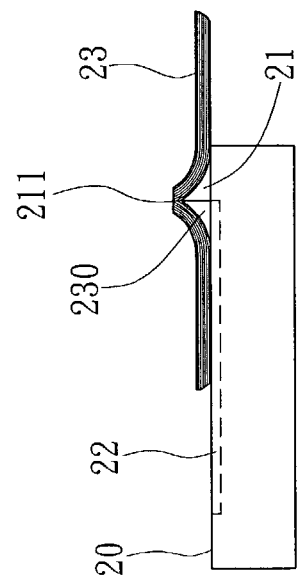
FIG. 3 is a preferable embodiment for illustrating the position of a book according to the invention.
Figure 3:
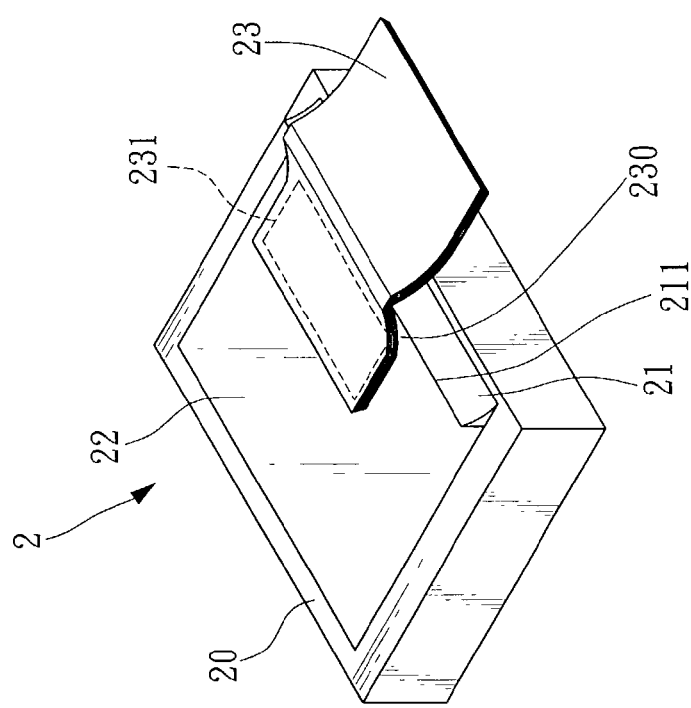

As shown in FIG. 3, which is an illustration for the preferable embodiment for positioning a book according to the invention. As shown in FIG. 3, the book of plural pages is placed on the positioning element 21, wherein the seamed recession part 230 stapled in the middle of the book is placed at the top end 211 of the positioning element 21; that is, the bulged-out part formed at the top end 211 of the positioning element 21 is just sandwiched in the seamed recession part 230 stapled in the middle of the book 23, which is just secured on the positioning element 21 without any movement whenever the book 23 is paged by human. In other words, the user just presses down the book for proceeding scanning action and aligns the recession part 230 to the positioning element 21 in every paging time. Further, since the positioning element 21 and the scanning window 22 have corresponding relationship, for example, the positioning element 21 being secured along the longitudinal extensive direction of the scanning window 22 so, when the book 23 is placed on the positioning element 21, it is a matter of fact that a positioning function is also generated, and the page surface 231 of the book 23 to be scanned is just located at the left side of the positioning element 21. Therefore, by the positioning element 21, it is possible to make the desired area (e.g., the page surface 231) to be scanned of the scanned object (e.g., the book 23) have a corresponding relationship with the scanning window 22 of the scanner 2.

Furthermore, the securing relationship and the assembling structure between the positioning element 21 and the shell body 20 are not restricted to the combination relationship between a sandwiching tennon and a sandwiching groove. As a matter of fact, a buckling manner with buckling elements may make both elements be connected or secured, or a screwing manner with screws may also be applied to make the both elements screwed and secured, or any other manner may be applied as long as they are appropriate. In sum, it is all appropriate as long as the positioning element may be secured on the scanning window of the scanner (when the positioning element is made of materials of high friction coefficient), or any manner for assembling objects may be applied to arrange the positioning element on the surface of the shell body.

Figure 4A:
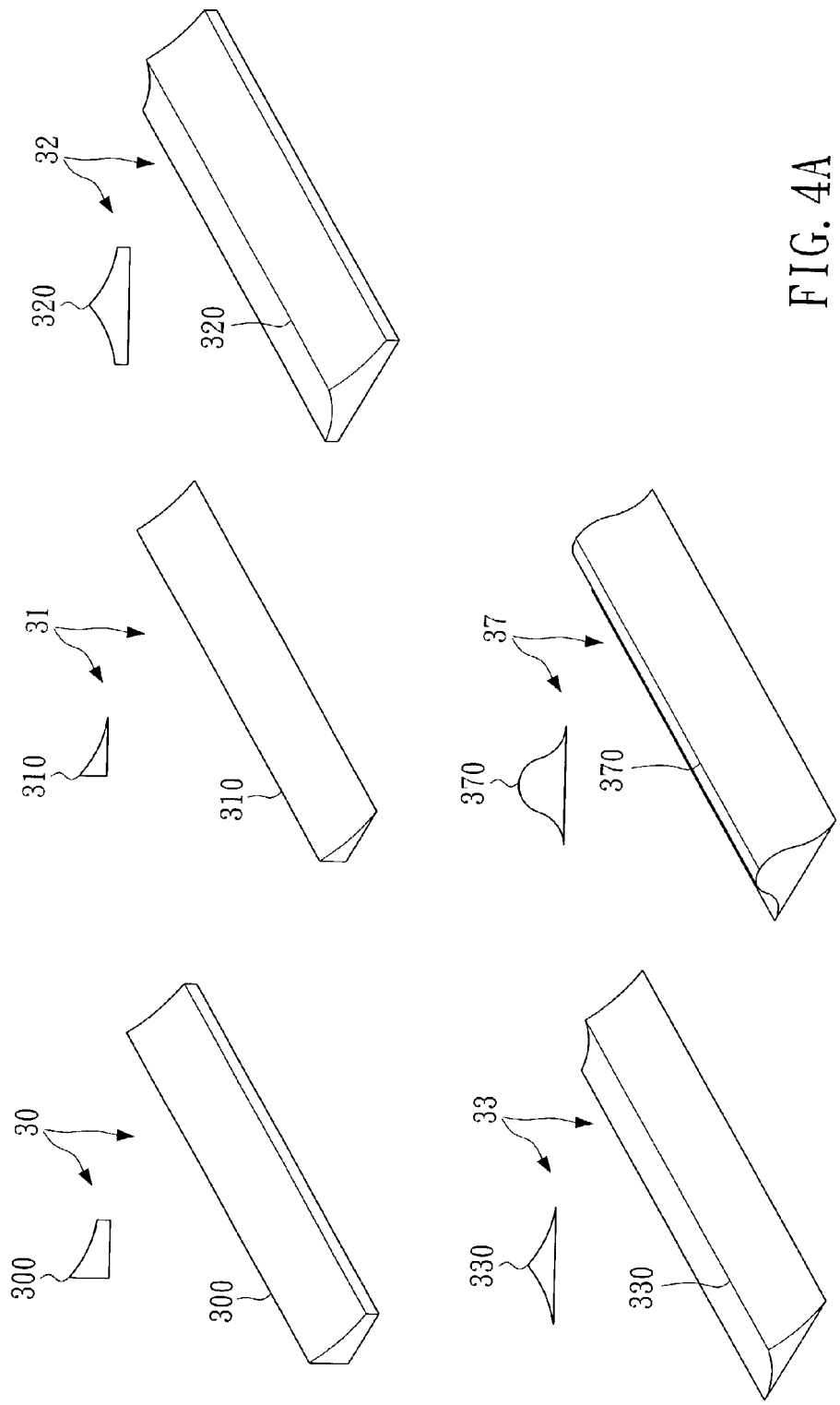
FIG. 4A and FIG. 4B are preferable embodiments for illustrating the various structures of the positioning elements according to the invention.
Figure 4B:
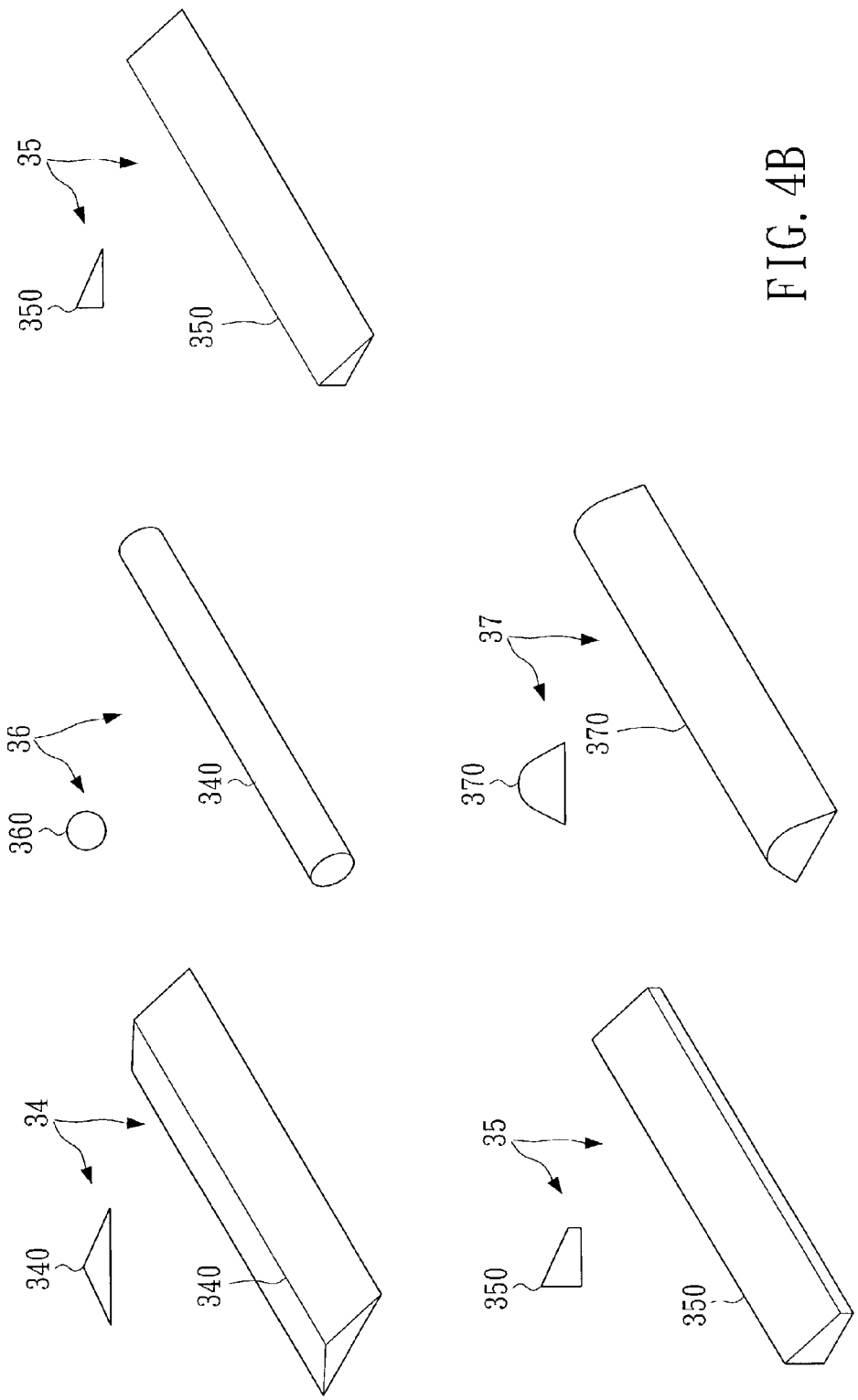

Please refer to FIG. 4A and FIG. 4B, which are various structural illustrations for the positioning element according to the invention. The positioning element according to the invention may have various structures. The structure of the positioning element 21 shown in FIG. 3 is just one kind of the implementing patterns. As shown in FIG. 4, the implementing patterns of the invention may further include the positioning elements 30, 31 having one curved surface, the positioning elements 32, 33 having two curved surfaces, the positioning elements 34, 35 having a form of triangular pillar (wherein the positioning element 34 has two inclining planes, and the positioning element 35 has one inclining plane), the positioning element 39 having one inclining plane, the positioning element 36 having a form of circular pillar, and the positioning element 37, 38 having a form of semicircular pillar, etc., wherein the positioning elements 30, 31, 32, 33, 34, 35, 39 respectively have sharp top ends 300, 310, 320, 330, 340, 350, 390, which have the same functions as those of the top end 211 of the positioning element 21 described in FIG. 3, while the positioning elements 36, 37, 38 have more obtuse top ends 360, 370, 380, which have the same functions as those of the top end 211 of the positioning element 21. From these embodiments, the positioning element of the invention indeed has many various patterns, which can not be described one by one in this application description, so only can the major variation patterns be proposed and described. The user may choose one appropriate pattern according to the sort, the thickness, the size, and the configuration, etc. of the books to be scanned.

Figure 5C:
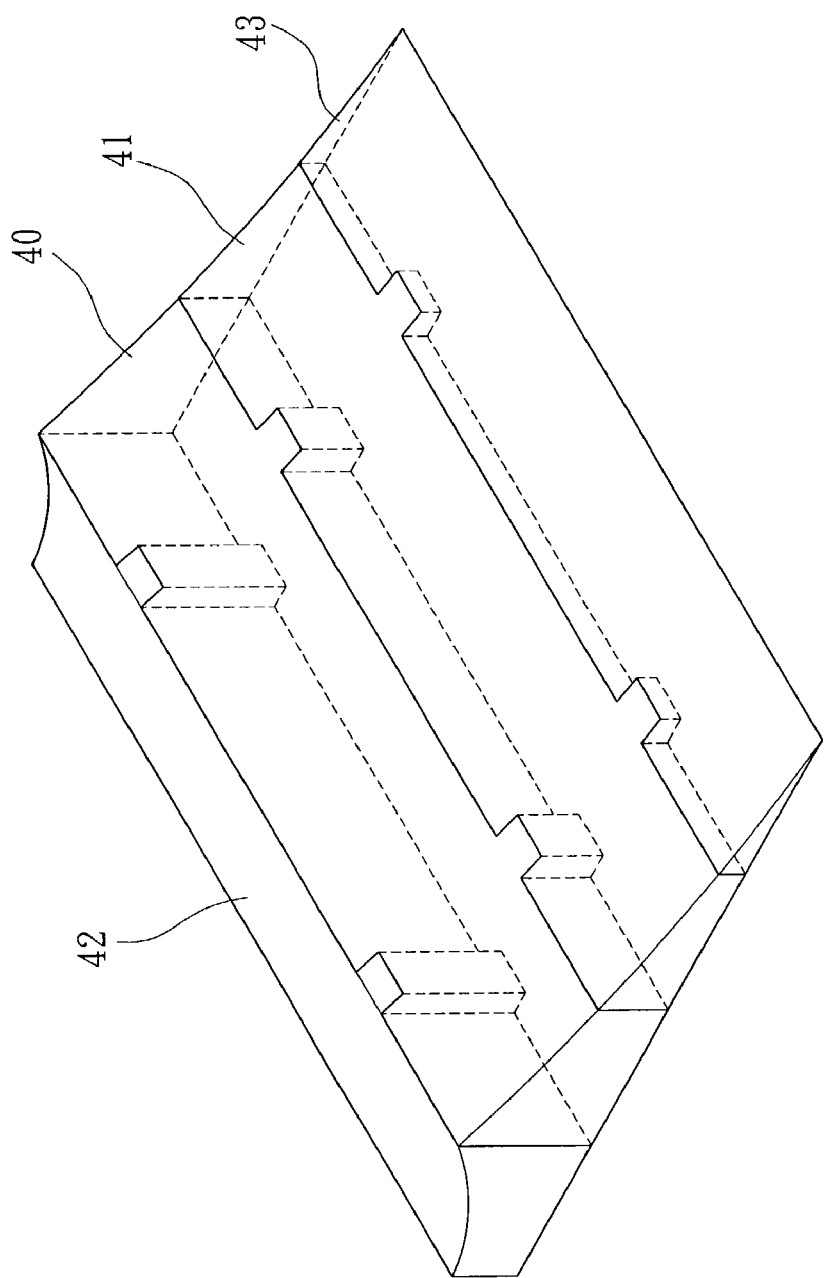
Figure 5D:
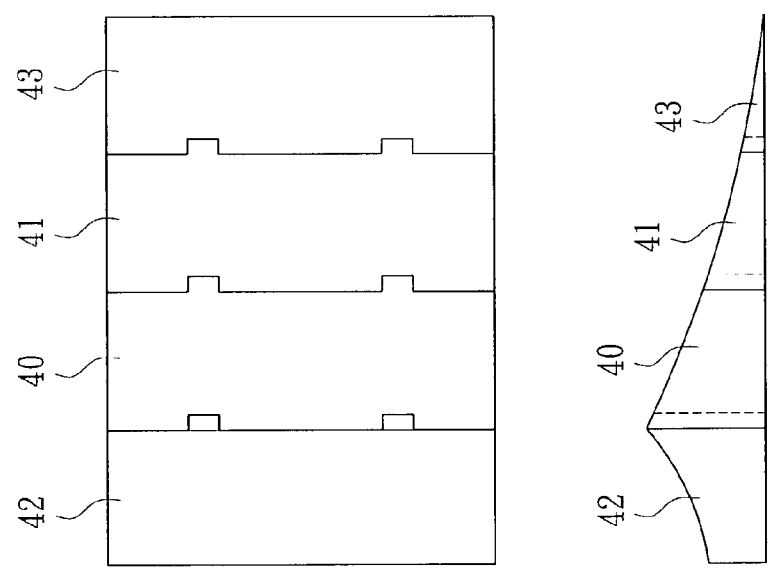

Please refer to FIG. 5A to FIG. 5D, which are the illustrations for the preferable embodiments for assembling the positioning element according to the invention. In the present invention, not just one positioning element can be applied in the scanner. As a matter of fact, through the design variation, many positioning elements may be arranged in the scanner, through those manners, of assembly, described thereinbefore. As shown in FIG. 5A, the positioning element 42 may be assembled with the positioning element 40 through insetting the sandwiching tennon 420 into the sandwiching groove 401, while the positioning element 40 also has the sandwiching groove 401 to be assembled with other positioning elements, so plural positioning elements of various forms may be assembled through this kind of manner. Please refer to FIG. 5B through FIG. 5D. FIG. 5B is a side view showing the assembly of positioning elements 40, 41, 42, 43, and FIG. 5C is a three-dimensional view showing the assembly of positioning elements 40, 41, 42, 43, and the FIG. 5D is a top view showing the assembly of positioning elements 40, 41, 42, 43. Through assembling manner, plural positioning elements may be formed into a larger positioning element, such as the assembling manner of the positioning elements 40, 41, 42, 43 and, of course, the assembling manner may also be achieved by another combination manner for each other. Assembling plural positioning elements must be dependent on the factors of the sort, the size, the thickness, and the form, etc. of the book to be scanned, and so are the book to be positioned and the size of the range of the page surface to be scanned decided and designed relatively.

Figure 6:
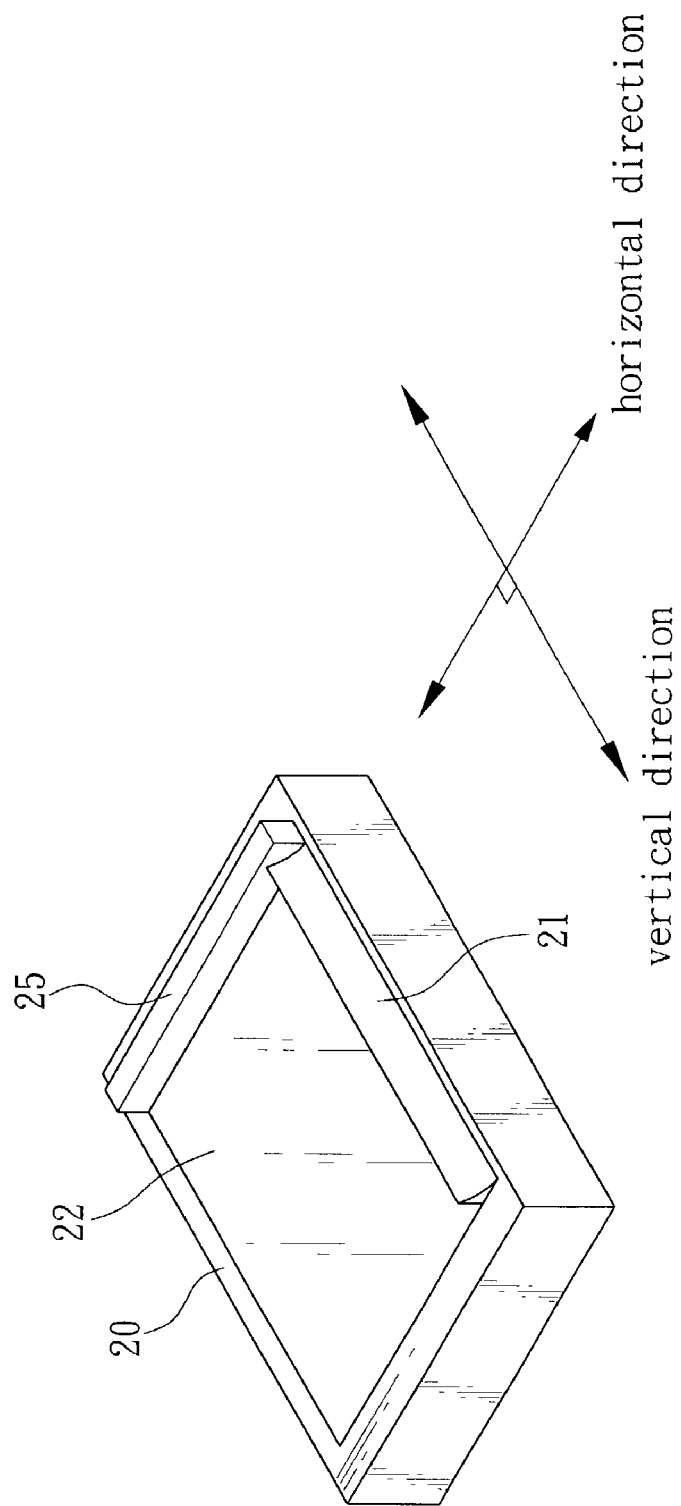
FIG. 6 is an illustration of a matching-up between the positioning element and the blocking block in accordance with one or more embodiments.

Please refer to FIG. 6, which is an illustration for the preferable embodiment for the matching-up between the positioning element and the blocking block according to the invention. As shown in FIG. 6, the positioning element 21 is placed in a vertical direction to the scanning window 22, so a blocking block 25 may be applied for being placed on the shell body 20; that is, the blocking block 25 is placed in a horizontal direction to the scanning window 22 and is matched with the positioning element 21 to position the book. Therefore, the extensive direction of the blocking block 25 (a horizontal direction to the scanning window 22) is made for being vertical to the extensive direction of the positioning element 21 (a vertical direction of the scanning window 22).

Summarizing the said description of above preferable embodiments, the invention, through the assembly between the positioning element and the scanner, may facilitate the user in positioning and securing a plural pages' book to be scanned, such that a more convenient and time-saving operation is achieved; that is, it may proceed the scanning action with more convenient and fast manner without the situation of poor scanning quality caused by the book's inclination and inferior position, and it may also enhance the distinguishing ability for the software to clearly distinguish the scanning data, and the shortcomings of the prior arts are overcome completely, and a superior scanning quality may further be obtained. Therefore, the image scanning function of a scanner may be fully developed under the application of the invention, which yet provides an enhancement of new effectiveness and, not only may the shortcomings of the prior arts be avoided, but also may the positioning device for the scanned object or document provide a convenient, real, and effective help to the user in operating a scanner.

What is claimed is:

1. An apparatus, comprising:
   a scanner capable of scanning a scanned object, wherein the scanner comprises a scanning window; and
   at least one positioning element at least partially extending above a planar surface of the scanning window, wherein the positioning element is capable of positioning the scanned object relative to the scanning window, and wherein at least a portion of the positioning element is capable of being sandwiched in a seamed recession part of the scanned object.

2. The apparatus according to claim 1, wherein the scanner comprises a flat-typed optical scanner.

3. The apparatus according to claim 1, wherein the scanning window comprises a transparent glass.

4. The apparatus according to claim 1, wherein the scanned object comprises a book.

5. The apparatus according to claim 1, wherein the positioning element is capable of being placed under the scanned abject and covered by the scanned object.

6. The apparatus according to claim 1 wherein the positioning element comprises two or more positioning elements capable of being assembled together.

7. The apparatus according to claim 1, wherein the positioning element comprises at least one top end.

8. The apparatus according to claim 1, wherein the positioning element comprises a curved surface.

9. The apparatus according to claim 1, wherein the positioning element comprises two curved surfaces.

10. The apparatus according to claim 1, wherein the positioning element comprises an inclining plane.

11. The apparatus according to claim 1, wherein the positioning element comprises two inclining planes.

12. The apparatus according to claim 1, wherein the positioning element comprises a triangular pillar.

13. The apparatus according to claim 1, wherein the positioning element comprises a circular pillar.

14. The apparatus according to claim 1, further comprising a blocking block arranged at a shell body of the scanner, and the blocking block is capable of being matched with the positioning element to position the scanned object.

15. The apparatus according to claim 1, wherein an extensive direction of the blocking block is vertical to an extensive direction of the positioning element.

16. The apparatus according to claim 1, wherein an extensive direction of the positioning element is a vertical direction to the scanning window of the scanner.

17. The apparatus according to claim 1, wherein an extensive direction of the blocking block is a horizontal direction to the scanning window of the scanner.

18. The apparatus according to claim 1, wherein the positioning element covers at least a portion of the scanning window.

19. The apparatus according to claim 1, wherein the positioning element is located on the surface of the scanning window.

20. The apparatus according to claim 1, wherein the positioning element is removably securable to the scanner.

21. The apparatus according to claim 20, wherein the positioning element comprises one or more of the following structures to removably secure the positioning element to the scanner: a tenon, a groove, a screw, a buckle, a fastener, and/or a higher coefficient of friction material, or combinations thereof.

22. An apparatus, comprising:
   at least one positioning element capable of positioning a scanned object relative to a scanning window of a scanner, and
   wherein at least a portion of the positioning element is capable of being sandwiched in a seamed recession part of the scanned object and is capable of at least partially extending above a planar surface of the scanning window.

23. The apparatus according to claim 22, wherein the positioning element is removably securable to the scanner.

24. The apparatus according to claim 23, wherein the positioning element comprises one or more of the following structures to removably secure the positioning element to the scanner: a tenon, a groove, a screw, a buckle, a fastener, and/or a higher coefficient of friction material, or combinations thereof.

25. The apparatus according to claim 22, wherein the positioning element is capable of being located between the scanned object and the scanning window of the scanner.

26. The apparatus according to claim 22, wherein the positioning element comprises two or more positioning elements capable of being assembled together.

27. The apparatus according to claim 26, wherein said two or more positioning elements comprise two or more forms.

28. The apparatus according to claim 22, wherein the positioning element comprises one or more of the following: a curved surface, two curved surfaces, an inclining plane, two inclining planes, a triangular pillar, and/or a circular pillar, or combinations thereof.

29. The apparatus according to claim 22, further comprising a blocking block capable of positioning the scanned object relative to the scanning window of the scanner, wherein an extensive direction of the blocking block is vertical with respect to an extensive direction of the positioning element.

30. The apparatus according to claim 22, wherein the positioning element is capable of being located on the surface of the scanning window.

31. A method, comprising:
scanning a scanned object through a scanning window; and
contacting a seamed recession part of the scanned object via at least a portion of a positioning element extending at least partially above a planar surface of the scanning window to position the scanned object relative to the scanning window.

32. The method according to claim 31, further comprising contacting the scanned object via a blocking block to position the scanned object relative to the scanning window, wherein an extensive direction of the blocking block is vertical with respect to an extensive direction of the positioning element.

33. An apparatus, comprising:
means for scanning a scanned object through a scanning window; and
means for contacting a seamed recession part of the scanned object to position the scanned object relative to the scanning window, wherein said means for contacting the seamed recession extends at least partially above a planar surface of the scanning window.

34. The apparatus according to claim 33, wherein said means for contacting the seamed recession is removably securable to the scanner.

35. The apparatus according to claim 33, wherein said means for contacting the seamed recession is capable of being located between the scanned object and the scanning window of the scanner.

36. The apparatus according to claim 33, wherein said means for contacting the seamed recession comprises two or more elements capable of being assembled together.

37. The apparatus according to claim 33, further comprising a means for contacting the scanned object to position the scanned object relative to the scanning window of the scanner, wherein an extensive direction of said means for contacting the scanned object is vertical with respect to an extensive direction of said means for contacting the seamed recession.

* * * * *

UNITED STATES PATENT AND TRADEMARK OFFICE
CERTIFICATE OF CORRECTION

PATENT NO. : 7,224,496 B2  
APPLICATION NO. : 10/211699  
DATED : May 29, 2007  
INVENTOR(S) : Lee et al.

It is certified that error appears in the above-identified patent and that said Letters Patent is hereby corrected as shown below:

At Title page, Item (76), please replace "KaoShiung" with --KaoHsiung--.  
    At column 6, line 12, please replace "abject" with --object--.  
    At column 6, line 60, please replace "scanner, and" with --scanner; and--.

Signed and Sealed this

Eighth Day of June, 2010

David J. Kappos  
*Director of the United States Patent and Trademark Office*